United States Patent [19]

Gilchrist et al.

[11] 4,291,765

[45] Sep. 29, 1981

[54] WATER FLOODING PROCESS USING MULTIPLE FLUIDS

[75] Inventors: Ralph E. Gilchrist, Corpus Christi; George W. Hover, Houston; Robert M. Barber, Spring, all of Tex.

[73] Assignee: Mitchell Energy Corporation, Houston, Tex.

[21] Appl. No.: 62,921

[22] Filed: Aug. 2, 1979

[51] Int. Cl.$^3$ .............................................. E21B 43/22
[52] U.S. Cl. ..................................................... 166/273
[58] Field of Search ................. 166/271, 273, 274, 275

[56] References Cited

U.S. PATENT DOCUMENTS

| | | | |
|---|---|---|---|
| 1,651,311 | 11/1927 | Atkinson | 166/275 |
| 3,367,418 | 2/1968 | Routson | 166/274 |
| 3,372,748 | 3/1968 | Cook | 166/273 |
| 3,493,051 | 2/1970 | Gogarty | 166/273 X |
| 3,684,011 | 8/1972 | Presley et al. | 166/274 X |
| 3,825,067 | 7/1974 | Vestal | 166/275 |
| 4,018,281 | 4/1977 | Chang | 166/273 |

FOREIGN PATENT DOCUMENTS 950354 7/1974 Canada .................................. 166/273

*Primary Examiner*—James A. Leppink
*Assistant Examiner*—George A. Suchfield
*Attorney, Agent, or Firm*—Kenneth H. Johnson

[57] ABSTRACT

A process for the recovery of oil from a subterranean formation containing oil, which is preferably a residium from a prior recovery operation which comprises injecting into said formation a first treatment fluid comprising an aqueous solution of polymer of 50 ppm to 5000 ppm polymer, for example a partially hydrolyzed polyacrylamide, in an amount of from 0.5 to 100% pore volume of the formation and thereafter injecting into said formation a second treatment fluid comprising a mixture of an aqueous solution of polymer and from 0.01 to 3.5 weight percent caustic, for example NaOH, in an amount of from 0.5 to 100% pore volume of the formation and recovering oil from the formation.

16 Claims, No Drawings

WATER FLOODING PROCESS USING MULTIPLE FLUIDS

BACKGROUND OF THE INVENTION

The present invention is concerned with secondary and tertiary recovery of petroleum (oil) from subterranean formations. In particular, the present invention is concerned with a system wherein water is the principal driving force of the recovery medium and more particularly, water systems containing partially hydrolyzed polyacrylamide polymers. Generally such systems may be classified as improved water flooding as compared for example, to secondary recovery using water alone, which is called "water flooding".

In the recovery of oil from underground reservoirs, even with the continued improvement in primary recovery techniques, substantial quantities of oil remain in the reservoirs. It has been estimated that only about 10 to 30% of the oil in the reservoir can be feasibly recovered by primary recovery techniques.

Due partially to its ready availability water has been extensively employed as the driving medium in secondary oil recovery. Although water flooding has been effective in obtaining additional oil from subterranean oil reservoirs, it has several deficiencies. Possibly, the most often noted of these is the tendency of flood water to "finger" through a reservoir and to bypass substantial portions of the reservoir. In other words, a water drive has less than perfect "sweep efficiency", in that it does not contact all portions of the reservoirs, and actual displacement is normally below its theoretical capacity.

"Fingering" is generally understood to result from the fact that the oil reservoirs possess regions and strata that have markedly varied permeabilities. The water, of course, flows more rapidly through those regions and strata having a greater relative permeability. As a result water flooding often misses substantial portions of the reservoir.

Early secondary flooding techniques employing a single fluid treatment are represented by the following U.S. Pat. Nos.: 1,651,311; 2,288,857; 2,341,500; 2,533,546; 2,731,414 and 2,771,138. Multiple injections have also been employed and represent an advance in the art, for example the injection of organic acid solutions followed by soap forming materials such as sodium hydroxide as exemplified by U.S. Pat. Nos. 3,174,542; 3,185,214; 3,111,984 and 3,368,621.

The use of a caustic solution as means to free the residual oil from the formation has long been practiced and is currently employed as shown by U.S. Pat. Nos. 1,651,311 (caustic added to a flooded reservoir); 3,175,610 (NaOH flooding); 3,414,053 (NaOH with soluble carbonate flooding) and 3,464,492 (ammonia introduced into formation to form soaps with acids in formation oil).

Various viscosifying agents such as natural or synthetic polymers are frequently employed in flooding solutions as shown in U.S. Pat. Nos. 3,039,529 (polymer); 3,372,748 (alternating slugs of polymer and caustic); 3,580,337 (polymer and divalent cations); 3,687,199 (two polymer slugs) and 3,825,067 (polymer and alkali).

Preinjection of polymers prior to a micellar slug (also called the surfactant or caustic slug) has been known and is examined by M. K. Dabbous in an article entitled "Displacement of Polymers In Waterflooding Porous Media and Its Effects on a Subsequent Micellar Flood", Society of Petroleum Engineers Journal, October 1977, pp. 358-368.

It can be readily seen that there has been an abundance of variations and combinations to raise the percentage of the residual formation oil which is recovered. It is a feature of the present invention that the particular combination of multiple treatment fluids provides a substantial increase in the oil recovery over either of the fluids alone or similar combinations of different fluids.

SUMMARY OF THE INVENTION

The present invention is a method of recovering oil from an oil containing subterranean formation or more particularly, an improvement in the method in which water is injected into the formation and oil is removed therefrom. Briefly, the method of recovering oil from an oil containing subterranean formation comprises injecting a first treatment fluid containing a polymeric viscosifier into the formation, and thereafter injecting a second treatment fluid containing a polymer and a caustic into the formation and recovering an oil fraction from the formation.

The flooding compositions may comprise 100% pore volume of the specified polymer or polymer-caustic fluid, and excellent oil recoveries can be obtained, however, the cost of employing only the polymer or polymer-caustic compositions is prohibitive and the preferred embodiments employ a slug of the polymer composition driven by water followed by a slug of the polymer-caustic solution driven by water.

Thus, the polymer or polymer-caustic treatment fluid may comprise from about 0.5% and preferably about 5% pore volume to 100% pore volume and the benefit of the invention obtained.

As with all such treatments, the particular nature and conditions of the underground formation must be considered, and preferably the method evaluated before hand for use in the specific formation. The evaluations preformed and described hereinafter, would indicate a wide applicability of the present method to oil producing formations of varying compositions.

The optimum range of each polymer or polymer-caustic slug appears to be in the range of about 5 to 50% or more preferably 10 to 30% pore volume driven by water. Normally the process would consist of the treatment in the sequence described with only the two slugs, however, repetition of the entire method in the sequence described may produce some additional recovery of formation oil.

The method of carrying out the stimulation of production of oil (and/or gas) from oil containing subterranean formation in the injection of the treatment fluids is that generally followed in the art. One or more injection wells are provided through which the treatment fluids and any driving fluid are introduced into the formation. Similarly, one or more producing wells are provided through which the oil and/or gas are recovered.

In carrying out the present process oil may br recovered after the first treatment fluid and/or the second treatment fluid. The production may be continuous as soon as flow is possible from the well or it may be interrupted between the first and second treatment fluids. A single treatment by the two fluids may be carried out or the process may be repeated until the oil recovery compared to cost is unattractive.

DETAILED DESCRIPTION OF THE INVENTION AND PREFERRED EMBODIMENTS

The polymer solutions are made up with polymers having a molecular weight high enough to impart appreciable increases in viscosity at low concentrations. It is generally desirable that the molecular weights be at least 1,000,000 in order to effect the desired increases in viscosity at the low concentrations which are economically feasible. Polymers having a molecular weight of 10,000,000 or higher may be employed.

Although natural polymers such as karaya gum, guar gum and the like may be employed as viscosifiers, synthetic polymeric materials are preferred and generally perform superiorly to the natural substances, for example, polyvinylpyridine, acrylamideacrylic acid copolymer, and copolymers of methyl vinyl ether and maleic anhydride. Partially hydrolyzed polyacrylamide polymers are particularly preferred viscosifiers. Other suitable synthetic polymers for use in the process of the invention include water-soluble homopolymers prepared from acyclic unsaturated carboxylic acids, such as acrylic acid and substituted acrylic acids, e.g., polyacrylic acid and sodium polymethacrylate; copolymers of unsaturated carboxylic acids, such as acrylic acid and methacrylic acid, with low molecular weight olefins ($C_2$–$C_6$) such as propylene and isobutylene; sulfonated polyvinyl aromatics, such as sulfonated polystyrene and sulfonated polyvinyl toluene; sulfonated copolymers of styrene and of vinyl toluene; and the like.

Other viscosifiers which may be included are modified natural products as hydroxyalkyl guar gum (e.g., hydroxyethyl guar gum and hydroxypropyl guar gum) hydroxy alkyl cellulose (e.g., hydroxy ethyl cellulose) and heteropolysaccharides produced by the action of bacteria of the genus Xanthomonas on carbohydrates.

The polymer employed may be a single polymer or mixture of polymers as described. The polymer in solution is employed in a concentration of from 50 ppm to 5000 ppm of polymer. Preferably in the polymer solution, a concentration of from 100 ppm to 1000 ppm of polymer is employed. Where more than one polymer is employed, the total concentration thereof are the same as for a single polymer.

The polymer-caustic solutions may be made up from the same polymers described above although the same polymer need not necessarily employed in both solutions in any particular treatment.

The caustic which is employed in the caustic solution includes the usual monovalent hydroxides and carbonates which afford relatively high pH at low concentrations. Generally, the alkali metal hydroxides and carbonates are employed. Specifically, sodium hydroxide, sodium carbonate, potassium hydroxide, sodium carbonate, potassium hydroxide, potassium carbonate, lithium hydroxide, lithium, carbonate, cesium hydroxide, or cesium carbonate may be employed. For economical reasons, sodium hydroxide or sodium carbonate is preferred. More than one caustic may be employed in the caustic solution if desired.

The caustic may be added to the solution either before or after the polymer, however, it has been found that the addition of caustic to polymer solution causes some increase in the viscosity of the solution, whereas the addition of polymer to caustic solution substantially avoids this effect. The increase in viscosity is attributed to some manner of crosslinking. It is, of course, possible to make use of the increase in viscosity by employing a less viscous solution of polymer than ultimately desired and by appropriate addition of caustic, raise the viscosity to the desired level.

The caustic is employed in a concentration in the range of from about 0.01 to 3.5 percent by weight, preferably in the range of 0.1 to 1.0 percent. A 0.5 wt. % of caustic is preferred, since all of the functions as desired are usually obtained at this level.

In operation of the present method there may be variations which are still within the scope of the invention, for example the polymer flood may be carried out at 100% pore volume followed by less than 100% pore volume polymer-caustic slug driven by water, alternately the polymer flood may comprise a less than 100% pore volume slug driven by water followed by a 100% pore volume polymer-caustic flood. These and other similar variations are contemplated as part of the present invention.

The term "water" in connection with water-flooding is used herein to include dilute aqueous solutions such as surface water, well water, rain water, city water, treated waste water, and suitable oil field brines. Any oil field brine which will form a precipitate with the aqueous fluids in the oil-containing formation is not deemed suitable and would not be employed in a waterflood.

The function of polymer in the first treatment is understood in the art to rectify interwell permeability variation. That is the polymer solution tends to seek the easiest path through the formation, thereby going into the most permeable structures, however, the viscous polymer solution then reduces the permeability of these structures, thereby equalizing to a degree, the formation permeability. The function of the caustic in the second flood is equally well known, but the reasons for the claimed sequencial polymer, polymer-caustic flood to produce an improved result are not so readily apparent. One possible mechanism is the polymer of the polymer-caustic flood maintains the integrity of the equalization achieved by the previous polymer flood. The combined polymer-caustic flood may also control the caustic mobility or the viscosity of the polymer-caustic solution may be a close match to the pseudo viscosity of the oil-water bank in the reservoir rock.

EXAMPLES 1–9

In this set of examples a sand pack was used to simulate a formation structure. The sand pack was made from a representative beach sand that was washed and dried prior to packing in a stainless steel pipe. The sand was poured into the tube using vibration to insure a tight pack. Glass wool was placed at each end to prevent the movement of sand during flow experiments. The sand pack was 2.54 cm in diameter and 76.2 cm long.

The pack was heated to 65° C. prior to testing. Brine saturation was then started, using water from Well 2-6, Alba Field, Wood County, Texas, having the following analysis:

|  |  | Major Ions Mg/l | % of Total Major Ions |
|---|---|---|---|
| Sodium | $Na^+$ | 34,459 | 42.67 |
| Calcaum | $Ca^{++}$ | 872 | 1.08 |
| Magnesium | $Mg^{++}$ | 260 | 0.32 |
| Potassium | $K^+$ | 82 | 0.10 |
| Chloride | $Cl^-$ | 43,822 | 54.26 |
| Bicarbonate | $HCO_3^-$ | 1,269 | 1.57 |

The tests were run at 65° C. and the test results are reported in Table I.

TABLE I**

| Example | 1 | 2 | 3* | 4* | 5* | 6* | 7* | 8* | 9* |
|---|---|---|---|---|---|---|---|---|---|
| PV Primary Fluid, Type | 100% PV, 250 ppm polymer | 100% PV, 250 ppm polymer | 20% PV, 250 ppm polymer | 20% PV, 250 ppm polymer | 20% PV, 250 ppm polymer | 20% PV, 250 ppm polymer | 20% PV, 250 ppm polymer | 20% PV, 0.5% NaOH + polymer | 30% PV, 0.5% NaOH + polymer |
| PV Secondary Fluid, Type | 100% PV, .25% NaOH + polymer | 100% PV, 1.0% NaOH + polymer | 5% PV, 0.5% NaOH + polymer | 15% PV, 0.5% NaOH + polymer | 20% PV, 0.5% NaOH + polymer | 25% PV, 0.5% NaOH + polymer | 35% PV, 0.5% NaOH + polymer | none | none |
| Initial Oil Saturation, % PV | 85.2 | 61.9 | 88.9 | 85.0 | 81.3 | 93.5 | 81.7 | 86.8 | 88.0 |
| Oil Saturation after primary fluid, % PV | 31.7 | 28.1 | 44.3 | 44.7 | 43.3 | 46.7 | 47.5 | 48.2 | 44.6 |
| Oil Saturation after secondary fluid, % PV | 25.2 | 21.9 | 37.4 | 37.2 | 33.4 | 35.9 | 37.7 | — | — |
| Oil Recovery, % of Oil in place Primary flood (polymer) | 62.8 | 54.5 | 50.1 | 47.4 | 46.7 | 50.0 | 41.9 | 44.5 | 49.3 |
| Secondary flood (polymer-caustic) after primary | 20.5 | 22.1 | 15.6 | 16.7 | 22.9 | 23.3 | 20.6 | — | — |

*The fluid slug is driven by fresh water
**Rock Properties:
Porosity, % — 47.6
Permeability to N₂, darcies — 3.4 to 3.9 (approx)
Permeability to brine, darcies — 1.7 to 1.9 (approx)
PV = Pore Volume
OIL: specific gravity @ 60° F. 0.970

| | | Major Ions Mg/l | % of Total Major Ions |
|---|---|---|---|
| Sulfate | $SO_4^{--}$ | — | — |
| Carbonate | $CO_3^{--}$ | — | — |

Total Solids by Evaporation—80, 764 Mg/l
Resistivity—0.132; Ohm-meters at 75° F.
pH 7.2; Specific Gravity—1.045 at 75° F.
Hardness ($Ca^{++} + Mg^{++}$) = 3247

An approximate brine permeability was determined at this time. The brine was displaced to irreducible water by flood in the pack with crude oil from Well 2-6 (oil specific gravity at 60° F. 0.970 gm/cc).

Next the polymer-flood was performed using the fluid or fluids as described below. The fresh water was from the Alba Field and had the following analysis.

| | | Major Ions Mg/l | % of Total Major Ions |
|---|---|---|---|
| Sodium | $Na^+$ | 360 | 30.64 |
| Calcium | $Ca^{++}$ | 3 | 0.26 |
| Magnesium | $Mg^{++}$ | 1 | 0.08 |
| Potassium | $K^+$ | 2 | 0.17 |
| Chloride | $Cl^-$ | 336 | 28.60 |
| Bicarbonate | $HCO_3^-$ | —450 | 38.29 |
| Sulfate | $SO_4^{--}$ | — | — |
| Carbonate | $CO_3^{--}$ | 23 | 1.96 |

Total Solids by Evaporation—782 Mg/l
Resistivity 7.19; Ohm-meters at 75° F.
pH 8.35; Specific Gravity 0.995 at 75° F.
Hardness ($Ca^{++} + Mg^{++}$) = 12

| Test Solutions | |
|---|---|
| Example 1 - Primary fluid | 250 ppm Dow 700* in fresh water |
| Secondary fluid | 0.25 wt % NaOH + 250 ppm Dow 700 in fresh water |
| Example 2 - Primary fluid | 250 ppm Dow 700 in fresh water |
| Secondary fluid | 1.0 wt % NaOH + 250 ppm Dow 700 in fresh water |
| Examples 3, 4, 5, 6, 7, 8 and 9 - Primary fluid | 250 ppm Dow 700 in fresh water |
| Secondary fluid | 0.5 wt % NaOH + 250 ppm Dow 700 in fresh water |

*Product of Dow Chemicals USA partially hydrolyzed polyacrylamide and is the polymer referred to in these examples (1-12)

In each example 1-7 the polymer-flood was performed using the indicated pore volume (PV) of primary fluid at an injection rate (frontal advance) of approximately 10 ft/day. Finally the caustic-flood was performed with the secondary fluids at the indicated PV at an injection rate of 10 ft/day. The caustic-flood was continued to zero oil cut and finally terminated at 3 pore volume throughput. In example 8 and only one treatment of the caustic-polymer fluid was used. It should be noted that some emulsification occurred in the produced fluids from the caustic (secondary flood). However, it was possible to break the emulsions with mild heating, and centrifuging of the effluent sample.

It can be seen that the combination of polymer flood followed by caustic-polymer flood of the invention provides a superior oil recovery over either polymer treatment alone (examples 1 and 2 where 100% of PV primary flood of polymer was used) or caustic-polymer flood alone (examples 8 and 9) compared to example 3 for instance where only 5% PV of caustic-polymer was used after a 20% PV polymer flood.

EXAMPLES 10 and 11

The two tests reported here were conducted in Berea sandstone cores 5.08 cm in diameter and 30.5 cm long. The tests were performed at a simulated reservoir temperature of 150° F.

The core used in this test had a permeability to nitrogen of 1156 md. After cutting, and prior to use, it was heated in an oven at 200° F. for a period of 12 hours. This increases the permeability slightly, by evaporating some of the interstitial water. The core was then mounted in a Hassler Core Holder, and evacuated with a vacuum pump. The Hassler holder was heated to 150° F., prior to test. Brine saturation was then started, using water from Well 2-6. The brine was displaced to irreducible water by flooding with crude oil from Well 2-6 (The water and oil are characterized above).

Next a polymer flood (250 ppm Dow 700 in fresh water) was performed using a (fresh-water-polymer) at an injection rate (frontal advance) of approximately 10 ft/day. The flood was terminated at 3 pore volumes and zero oil-cut. The secondary fluid was injected at an injection rate (frontal advance) of approximately 10 ft/day.

Two tests were performed. In Example 10 a slug (25% PV) of polymer driven by fresh water was displaced in the first test. This was followed by a slug (25% PV) of caustic polymer followed by fresh water. In the second test (Example 11) a slug (25% PV) of polymer was displaced by fresh water, followed by a 25% caustic (only) slug driven with fresh water. The results are set out in Table II.

The polymer caustic solution (Example 10) was made prior to test at concentrations of 250 ppm Dow 700 and fresh water containing 0.5% by weight of NaOH.

It should also be noted that some emulsification occurred in the produced fluids from the caustic flood. However, it was possible to break the emulsions with mild heating, and centrifuging of the effluent sample.

EXAMPLE 12

The test reported here was conducted in three fluid cores 2.54 cm in diameter and a total of 17.8 cm in length. The test was performed at a simulated reservoir temperature of 150° F.

The test core was cut in a horizontal plane from field cores provided from the Alba Field. The core depth was noted to be 4328 ft. From the core laboratory report, the permeability and porosity at this depth was taken to be 1126 md and 24.7%, respectively. Because of the shaley condition of the core, these values may vary for the plug taken in the laboratory. The core was then placed in a retort containing xylene and heated for six hours. It was then removed and placed in an oven where it was heated at 200° F. for a period of 12 hours. The core was then mounted in a Hassler Core Holder, and evacuated with a vacuum pump. The Hassler holder was heated to 150° F., prior to test. Brine saturation was then started, using water from Well 2-6. The brine was displaced to irreducible water by flooding with crude oil from Well 2-6.

Next a polymer-flood was performed using a (fresh-water-polymer) at an injection rate (frontal advance) of approximately 10 ft/day. The flood was terminated at 3 pore volumes and zero oil-cut.

Then a polymer-caustic flood was performed (using concentrations of 250 ppm Dow 700 and fresh water containing 0.5% by weight of NaOH). This was injected at an injection rate (frontal advance) of approximately 10 ft/day.

One test was performed. A slug (20% PV) of polymer driven by fresh water was displaced first. This was followed by a slug (25% PV) of caustic-polymer followed by fresh water. The results are reported in Table II.

It should also be noted that some emulsification occurred in the produced fluids from caustic flood. However, it was possible to break the emulsions with mild heating and centrifuging of the effluent sample.

The comparison with the Berea core, Example 10, demonstrates the viability of this procedure and its significant advantage for field use.

TABLE II*

| Example | 10 | 11 | 12 |
|---|---|---|---|
| PV Secondary Fluid, Type | 25% PV, 250 ppm polymer 25% PV 0.5% NaOH + polymer | 25% PV, 250 ppm polymer 25% PV 0.5% NaOH | 20% PV 250 ppm polymer 25% PV 0.5% NaOH + polymer |
| Initial Oil Saturation, % PV | 66.1 | 70.5 | 68.2 |
| Oil Saturation After Primary Fluid, % PV | 35.7 | 38.1 | 40.0 |
| Oil Saturation After Secondary Fluid % PV | 28.3 | 35.7 | 31.4 |
| Oil Recovery, % Oil in place Primary Flood, % | 45.9 | 45.9 | 41.3 |
| Secondary Flood, (after primary flood) % | 20.8 | 6.2 | 21.5 |

*The fluid slug is driven by fresh water.
Rock Properties
Porosity, % 25.
Permeability to N$_2$, darcies 1156.
PV - Pore Volume The substantial improvement demonstrated by the present claimed process (Examples 10 and 12) is readily apparent in comparison with a prior art method using only caustic in the second treatment (Example 11).

The invention claimed is:

1. A method of recovering oil from an oil containing subterranean formation comprising:
   injecting a first non-caustic treatment fluid consisting essentially of water and a polymeric viscosifier in an amount of 10 to 30% pore volume of the formation and driven by water into the formation, thereafter, injecting a second treatment fluid containing a polymer and a caustic in an amount to 10 to 30% pore volume of the formation and driven by water into the formation, and recovering an oil fraction from said subterranean formation.

2. The method according to claim 1 wherein the polymer is employed in said first and second treatment fluids in a concentration of from 50 ppm to 5000 ppm, respectively.

3. The method according to claim 2 wherein the polymer is employed in said first and second treatment fluids in a concentration of 0.01 to 0.1 weight percent, respectively.

4. The method according to claim 3 wherein the same polymer and concentration of polymer is employed in both treatments.

5. The method according to claim 1 wherein said caustic is present in the range of about 0.01 to 3.5 percent by weight.

6. The method according to claim 5 wherein said caustic is present in the range of about 0.1 to 1.0 percent by weight.

7. The method according to claim 6 wherein said caustic is present in the amount of about 0.5 weight percent.

8. The method according to claims 5, 11 or 12 wherein said caustic is selected from alkali metal hydroxides or alkali metal carbonates.

9. The method according to claim 8 wherein said caustic is selected from sodium hydroxide, sodium carbonate, potassium hydroxide, potassium carbonate, lithium hydroxide, lithium carbonate, cesium hydroxide or cesium carbonate.

10. The method according to claims 1, 3 or 6 wherein said polymers are water soluble polymers independently selected from the group consisting of partially hydrolyzed polyacrylamide polymers, polymers of acrylic unsaturated carboxylic acids, copolymers of unsaturated carboxylic acids and low molecular weight olefin, sulfonated polyvinyl aromatics, sulfonated copolymers of styrene and vinyl toluene and mixtures thereof.

11. The method according to claim 10 wherein said polymers are selected from the group consisting of partial hydrolyzed polyacrylamide polymers, polyacrylic acid, sodium polymethacrylate, sulfonated polystyrene, sulfonated polyvinyl toluene and mixtures thereof.

12. The method according to claim 11 wherein said polymer is partially hydrolyzed polyacrylamide.

13. The method according to claim 1 wherein said first treatment fluid comprises from 100 ppm to 1000 ppm of partially hydrolyzed polyacrylamide in water employed in an amount of 10 to 30% pore volume, said second treatment fluid comprises from 0.1 to 1.0 weight percent NaOH and from 100 ppm to 1000 ppm of partially hydrolyzed polyacrylamide in water employed in an amount of 10 to 30% pore volume, each of said first and second treatment fluids being driven in said formation by water.

14. The method according to claim 1 wherein said water will not form a precipitate in the oil containing formation.

15. A method of stimulating production of oil or gas from an oil containing subterranean formation having injection means comprising at least one injection well and a producing well means comprising at least one production well in the formation, comprising the steps of:

(a) Injecting through an injection well means a fluid consisting essentially of non-caustic aqueous solution containing a partially hydrolyzed polyacrylamide in a concentration of from 50 ppm to 5000 ppm of polymer in a slug comprising 5.0 to 35 volume percent of the formation pore space driven by water, (b) thereafter injection through an injection well means an aqueous solution containing a partially hydrolyzed polyacrylamide in a concentration of from 50 ppm to 5000 ppm of polymer and a caustic in a concentration of 0.1 to 1.0 weight percent, in a slug comprising 5.0 to 35 volume percent of the formation pore space driven by water, wherein said injections drive oil within said formation toward the producing well means, and (c) producing oil to the surface through said producing well means.

16. The method according to claim 15 wherein water is used to drive said slugs through said formation.

* * * * *